US009642036B2

(12) United States Patent
Xiao et al.

(10) Patent No.: US 9,642,036 B2
(45) Date of Patent: May 2, 2017

(54) RELIEVING CONGESTION IN WIRELESS LOCAL AREA NETWORKS

(71) Applicant: FUJITSU LIMITED, Kawasaki-shi, Kanagawa (JP)

(72) Inventors: Hui Xiao, West Drayton (GB); Mick Wilson, Romsey (GB); Kevin Power, Glasgow (GB)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 14/224,257

(22) Filed: Mar. 25, 2014

(65) Prior Publication Data

US 2014/0293790 A1 Oct. 2, 2014

(30) Foreign Application Priority Data

Mar. 27, 2013 (EP) ..................................... 13161442

(51) Int. Cl.
*H04W 28/02* (2009.01)
*H04L 12/803* (2013.01)
*H04W 48/06* (2009.01)
*H04W 84/12* (2009.01)
*H04W 48/20* (2009.01)

(52) U.S. Cl.
CPC ....... *H04W 28/0289* (2013.01); *H04L 47/122* (2013.01); *H04W 28/0252* (2013.01); *H04W 28/0284* (2013.01); *H04W 48/06* (2013.01); *H04W 48/20* (2013.01); *H04W 84/12* (2013.01)

(58) Field of Classification Search
CPC . H04W 28/0289; H04W 76/00; H04W 84/12; H04W 28/0252; H04W 28/0284; H04W 48/06; H04W 48/20; H04W 76/02; H04L 47/122

USPC ........................................................ 370/235
See application file for complete search history.

(56) References Cited

U.S. PATENT DOCUMENTS

| 8,874,725 | B1* | 10/2014 | Ganjam et al. ................ 709/224 |
| 8,874,964 | B1* | 10/2014 | Lakshminarayanan et al. .............................. 714/26 |
| 2005/0213579 | A1* | 9/2005 | Iyer et al. .................. 370/395.2 |
| 2008/0186882 | A1* | 8/2008 | Scherzer et al. .............. 370/310 |

(Continued)

OTHER PUBLICATIONS

M. Abusubaih et al., "An Inter-Access Point Coordination Protocol for Dynamic Channel Selection in IEEE802.11 Wireless LANs," May 2007, 8 pages.

(Continued)

*Primary Examiner* — Luat Phung
*Assistant Examiner* — Thomas R Cairns
(74) *Attorney, Agent, or Firm* — Staas & Halsey LLP (57) ABSTRACT

A wireless local area network, WLAN, comprising: access points arranged to maintain wireless links with terminals each arranged to initiate a wireless link with an access point, and to associate with an access point during a service session. A central association server is connected to each of the access points, and is arranged to gather information from a plurality of the terminals via the wireless links between terminals and access points, determine, based on the gathered information, with which access point a terminal which has initiated a wireless link should associate during its service session, and notify the terminal, via the access point with which the terminal initiated the wireless link, of the access point so determined.

9 Claims, 5 Drawing Sheets

(56) References Cited

U.S. PATENT DOCUMENTS

2008/0320108 A1* 12/2008 Murty et al. .................. 709/220
2014/0347985 A1* 11/2014 Yi ......................... H04W 76/02
　　　　　　　　　　　　　　　　　　　　　　　370/230

OTHER PUBLICATIONS

S. K. Dandapat et al., "Smart Association Control in Wireless Mobile Environment Using Max-Flow," *IEEE Transactions on Network and Service Management*, vol. 9, No. 1, Mar. 2012, pp. 73-86.
A. Baid et al., "Network Cooperation for Client-AP Association Optimization," *8th International Workshop on Resource Allocation and Cooperation in Wireless Networks 2012*, May 2012, pp. 431-436.
Extended European Search Report mailed Sep. 24, 2013 in corresponding European Patent Application No. 13161442.2.

* cited by examiner

RELIEVING CONGESTION IN WIRELESS LOCAL AREA NETWORKS

CROSS-REFERENCE TO RELATED APPLICATIONS

This application claims the benefit of European Application No. 13161442.2, filed Mar. 27, 2013, the disclosure of which is incorporated herein by reference.

BACKGROUND

1. Field

The embodiments relate to wireless local area networks or WLANs, and more particularly WLANs capable of operating in accordance with IEEE802.11 standards.

2. Description of the Related Art

Since the introduction of the first IEEE802.11 standard in 1997, WLANs have become ubiquitous in homes, offices, airports and other public places as a way for wireless devices to access the Internet or a company Intranet. Although the IEEE802.11 group of standards is not the only standard applicable to WLANs, it is the pre-eminent standard and therefore, in the remainder of this specification, the term "WLAN" is to be understood as referring primarily to IEEE802.11, without excluding other standards defining wireless networks operating on similar lines. IEEE802.11 is popularly known as Wi-Fi™. Wi-Fi is a trade mark of the Wi-Fi alliance, which defines Wi-Fi as "any wireless local area network (WLAN) products that are based on the Institute of Electrical and Electronic Engineers' (IEEE) 802.11 standards".

There are essentially two types of WLAN topology: the ad-hoc network in which wireless devices communicate with each other without involving any central access points or any connection to a wired network, and, an infrastructure wireless network (of more relevance to the to be described) in which a so-called Access Point (AP), connected to a (wired) backhaul network such as broadband Internet, provides a bridge to a number of wireless devices in wireless communication with the AP. The AP is thus the nearest equivalent to a base station in a wireless cellular telephone system. The coverage area provided by one AP is referred to as a "hotspot". Although each hotspot has typically a size of only tens of meters, a larger area can be covered by using multiple geographically-overlapping APs. The hotspots may thus be regarded as cells and the WLAN may form (or contribute to) a Small Cell Network (SCN). As in a cellular telephone system, handovers of mobile wireless devices from one AP to another are possible as the wireless devices move between APs.

The wireless devices (also called "clients" or "terminals") may be laptop computers, tablets, smartphones or other portable devices, as well as peripheral devices such as printers, equipped with a radio capable of wireless communication on WLAN frequencies and in accordance with the applicable Wi-Fi standard. At least some of these client devices will be multi-RAT devices, capable of wireless communication in accordance with other radio access technologies (RATs) apart from Wi-Fi, in particular wireless cellular technologies such as 3G or LTE.

The AP may take the form of a wireless router or may be combined in another device, for example a Home eNB (HeNB) employed in an LTE wireless cellular system. Where several APs in a given area or building are connected to the same wired network, this is called a distribution system. An AP may also be provided by a suitably-equipped smart phone, which differs from conventional APs in that the connection to the backhaul network is wireless.

As Wi-Fi-capable devices proliferate, WLANs are becoming increasingly crowded; nevertheless WLAN may be the preferable option for wireless communication by multi-RAT devices in terms of coverage and/or data throughput, especially indoors where cellular wireless coverage may be patchy.

Figure 1:
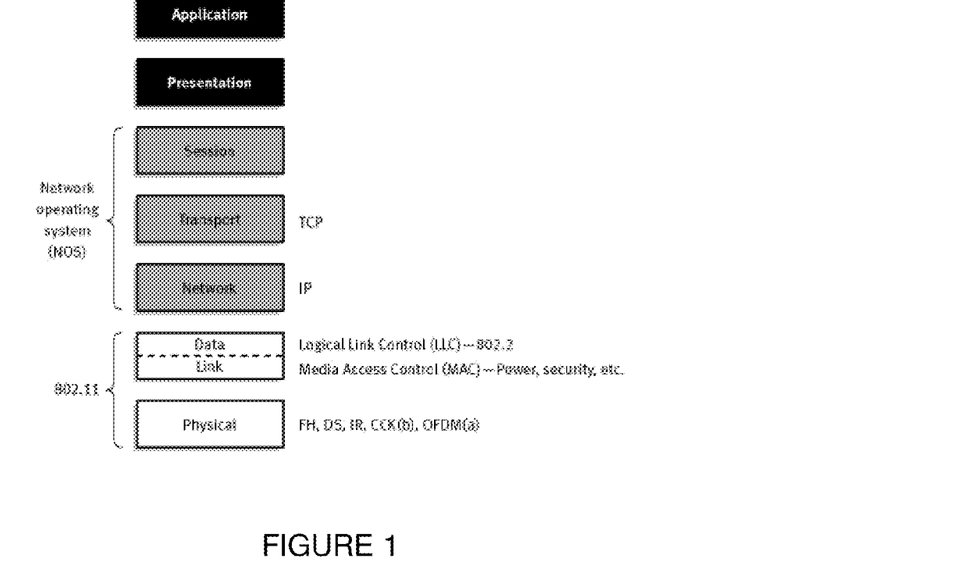
FIG. 1 shows the OSI model as it applies to a WLAN.

The IEEE802.11 standards relate to the data link layer and physical layer in the standard ISO seven-layer model, as depicted in FIG. 1.

The physical layer (PHY) depends on the specific standard (such as 802.11b, 802.11g, 802.11n and so on), and may also depend on the geographical area. Typically there are two operating frequency bands, 2.4 GHz and 5 GHz, each divided into a number of partially-overlapping channels, also called sub-channels (for example fourteen channels each 22 MHz wide). At any one time, an AP employs just one of these channels, on each of one or both frequency bands, for its data traffic with all the wireless devices connected to it. The AP also transmits beacon signals which the clients can scan for in order to detect APs within range.

Data is wirelessly transmitted in the form of packets each conforming to an Ethernet frame format, including source and destination IP addresses. An autorate algorithm is used to maximize the data rate over the wireless link.

Although only three of the available channels are completely non-overlapping, this allows for various APs to be deployed in a given geographical area without excessive mutual interference, by being set to different channels. On the other hand, using the same channel for all the wireless devices of an AP leads to the possibility of simultaneous access (collisions) by clients.

The Data Link Layer consists of two sub-layers: Logical Link Control (LLC) and Media Access Control (MAC). The LLC is based on the same standards as other IEEE802 networks, allowing easy interfacing with the wired network.

Figure 2:
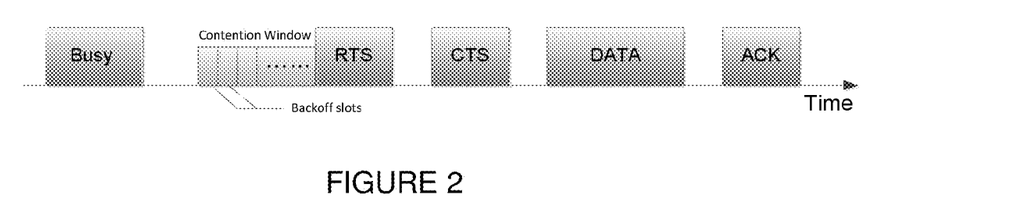
FIG. 2 shows the CSMA/CA technique employed in Wi-Fi.

The MAC layer of a WLAN handles access to the wireless medium by different clients, using the Carrier Sense Multiple Access with Collision Avoidance (CSMA/CA) mechanism. This is a "listen before talk" scheme used to avoid collisions by deferring access to the medium. For example, a device wishing to transmit data has to first listen to the channel for a predetermined amount of time to determine whether or not another device is transmitting on the channel within the wireless range. If the channel is sensed "idle", then the device can start its transmission process. If the channel is sensed "busy", the device defers its transmission for a random time period. To avoid collisions, client devices use a random backoff time after each frame to decide when to transmit, with the first transmitter seizing the channel. This is termed the contention-based medium access mechanism. The backoff time of each device generated is between 0 and the length of contention window (CW). The default size of the CW is set as part of contention configuration when the client associates with the AP. The request to send (RTS)/clear to send (CTS) procedure is used to further reduce the possibility of collisions for frames that are larger than the RTS threshold. FIG. 2 illustrates the CSMA/CA mechanism with RTS/CTS.

The contention-based medium access mechanism is adopted in both uplink (UL) and downlink (DL), and the AP is half duplex which means it can send or receive data but not both at the same time.

Another responsibility of the MAC layer is so-called association, which refers to connections of wireless devices to an AP. Each AP generally broadcasts an identifying code (SSID), or at least can be interrogated to provide it. Conventionally, when a wireless device detects SSIDs of APs within range, it chooses which AP it wishes to connect to—or "associate" with—based on signal strength or by user selection, and sends a request (Association/Reassociation Request) to the appropriate AP. If the AP accepts the request, it sends an Association Response and a wireless link is set up between the AP and wireless device (including any necessary authentication steps, depending on the security level of the WLAN). In this way a "session" is initiated for wireless communication between the wireless device and AP.

Thus, conventionally, the wireless device decides which AP to associate with, and this association is maintained for the duration of a session between the wireless device and AP, until the wireless link is terminated in some way, for example by the wireless device moving out of range of the AP. This causes a handover to another AP: the wireless device detects that a different AP would provide a better signal strength than the AP with which the wireless device is currently associated, so the wireless device "reassociates" with the new AP. The reassociation process is basically the same as for association, except that the client informs the new AP of the SSID of the previous AP. If the new AP uses a different channel from the previous AP then the wireless device will need to retune its radio accordingly.

Figure 3:
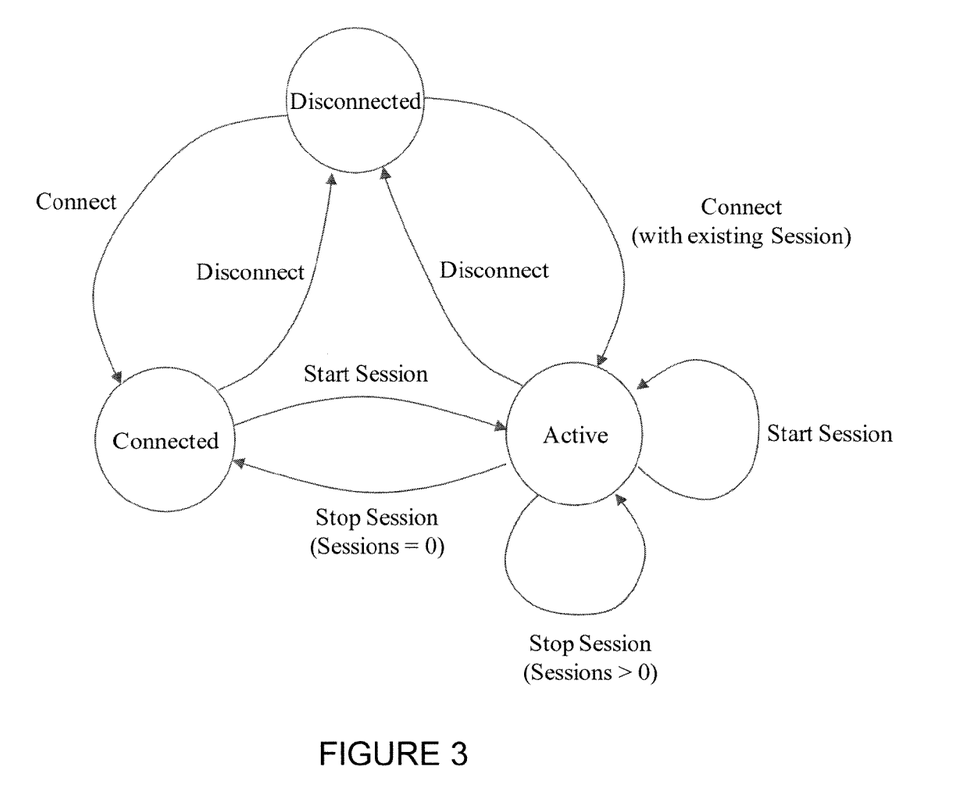
FIG. 3 shows the state machine of a terminal (client) in a WLAN.

FIG. 3 shows a state machine for a wireless device in a WLAN. There are three statuses defined for a wireless device, namely disconnected, connected and active. When clients enter a Wi-Fi network, with the typical equipment configurations, they select the APs to associate with based on the strongest received signal strength, as already mentioned. Clients after completing initial association and before starting any service sessions are regarded as being in the connected mode.

The dense deployment of small cell networks (SCN) has gained much attention in the mobile industry due to its potential for coping with fast growing data traffic. The almost ubiquitous broadband coverage and the popularity of smart phones and portable devices have led to the mobile data traffic surpassing voice on a global basis. It is predicted that there will be an exponential increase in mobile data traffic during the years to come. This development will be driven mainly by new, unique mobile applications (navigation, social networking, video telephony, etc.) being rich in multi-media content and increasing mobile broadband substitution through smart phones and USB-dongles. In reality, many operators have rolled out the dense deployment of SCN in the high traffic areas for coverage improvement and capacity boosting purposes. For example, Alcatel-Lucent and U.S. service provider Sprint announced an agreement on 6 Aug. 2012 to deploy Alcatel-Lucent's lightRadio™ Metro Cells to augment coverage in high-traffic areas; O2 launched free Wi-Fi services in central London before London 2012 Olympics, this Wi-Fi service being free to all users regardless of their cellular network provider.

The general term SCN covers a range of radio network design concepts which are all based on the idea of deploying BSs much smaller than the traditional macro cell devices to offer extended coverage (to indoor area or coverage hole areas of the existing macro cells) or support high demand in capacity. Small cells target at a coverage radius of 20-150 m and radiate at low power (0.01-10 W). Possible deployment scenarios include public indoor and outdoor with open or close access, residential and enterprise environments. In this sense, SCNs comprise low-power micro, pico and femto cells. These SCNs can be categorized as operator-managed SCNs.

In the contrast, the Wi-Fi APs deployed in a home or office using unlicensed spectrum can be regarded as forming a non operator-managed SCN. Nowadays in many home and office areas Wi-Fi access points have been widely used for a variety of services and applications. Since the Wi-Fi enabled smart phones and consumer electronics devices are increasingly entering the market, the utility of Wi-Fi will continue to grow. Both the operator-managed SCN and Wi-Fi SCN have their own advantages. It is very likely that 3G/4G femto cells and Wi-Fi access points will coexist in the future. In fact, there already are small cell access devices with 3G (and/or 4G) and Wi-Fi access technologies integrated in the same box coming out in the recent small cell market. Therefore the consumer and enterprise can greatly benefit from having both technologies available, for example, this can allow the user equipment (client) to optimally select the most appropriate wireless connection among different RATs or to simultaneously connect to multiple RATs and use the aggregated bandwidth from them. Furthermore, with the densification of small cell deployment in today's life, there is also a need to optimize the associations of clients with different APs using the same or different RATs. For example load balancing may be desirable to spread users and traffic more evenly among the available APs.

Attempts have been made to achieve load balancing among APs, but these generally involve causing an AP which is highly-loaded to refuse to accept further connections, which causes inconvenience to users.

OpenFlow™ is one technology of possible application to WLANs as well as to wired networks. Open Flow is a protocol which allows a server to provide rules to individual network switches on where to send packets, instead of each switch deciding for itself how to do so. Thus, in the context of a WLAN, Open Flow allows the possibility of centralized coordination of a number of commonly-connected APs, without however providing any template or approach for doing so. Open Flow is one example of a methodology called Software Defined Networking (SDN).

Currently with the typical configuration of clients that can support multimode RATs, they automatically select Wi-Fi APs for data traffic transmission once they are under the coverage of home or enterprise WLANs. Moreover clients typically select which AP to associate with using only locally available information and most of them use signal strength as the dominant factor in selecting an AP. However, this can result in some RATs and APs become more congested than the others which will cause the degradation in quality of experience (QoE) of clients. For example, when a lot of clients congregate in a conference room, they all tend to select the same Wi-Fi AP even when multiple APs operating on different channels are available. Therefore, in order to ease the traffic congestion and improve the QoE of client in this kind of scenarios, there is a need for optimization algorithms to manage the associations of clients with different APs using the same or different RATs.

SUMMARY

According to a first aspect, there is provided a wireless local area network, WLAN, comprising:3/25/2014
  access points arranged to maintain wireless links with
    terminals;

terminals each arranged to initiate a wireless link with a said access point, and to associate with a said access point during a service session; and a central association server connected to each of the access points, and arranged to:
  gather information from a plurality of the terminals via the wireless links between terminals and access points;
  determine, based on the gathered information, with which access point a terminal which has initiated a wireless link should associate during its service session; and
  notify the terminal, via the access point with which the terminal initiated the wireless link, of the access point so determined.

Here, the term "terminal" refers to any wireless device capable of acting as a client or station in a WLAN, regardless of any other capabilities of the device such as other RATs. The terms "client", "wireless device" and "terminal" are interchangeable unless the context demands otherwise.

The terminals are preferably arranged, after initiating a wireless link with an access point, to send a session request to that access point, and the central association server is arranged to detect the session request and to perform the determining in response to detecting the session request.

Preferably the terminals are further arranged to provide information to the central association server (through the access points) in response to a request from the central association server, received via the wireless links between terminals and access points.

Information gathered from a terminal by the central association server can include at least:
  an indication of a channel condition between the terminal and each of a plurality of access points; and
  an indication of congestion on a wireless link between the terminal and an access point which maintains the wireless link with the terminal.

Here "channel condition" can include signal strength (RSSI), and/or long-term signal-to-noise ratio (SNR).

Each terminal is preferably arranged to measure round-trip times of packets on said wireless link to and from the access point, and to provide an average of said times to the central association server as said indication of congestion.

The central association server may be arranged to derive a transmission rate from the indication of channel condition received from a said terminal with respect to a said access point, and to combine the transmission rate with indications of congestion with respect to the said access point received from other said terminals, to form an association indicator for the said terminal with respect to the said access point, the association indicator having a value representing an expected data rate of a wireless link between the said terminal and the said access point.

In this case, preferably, for each terminal which sends a session request to an access point, the central association server is further arranged to:
  form the association indicator for the terminal with respect to each of a plurality of access points,
  arrange the access points by value of the respective association indicators, to provide a list of candidate access points for the terminal in order of preference, and
  determine the access point with which the terminal should associate during its service session by comparing the candidate access points for the terminal with the candidate access points of other terminals.

In the event that more than one terminal has the same preference for a given access point, the determining can be made on the basis of the association indicator for each terminal with respect to the access point.

A terminal may initiate a wireless link with a said access point using a different radio access technology from a radio access technology employed by the access point determined in said determining to maintain the service session. That is, although the method basically applies to determining an optimum AP in a WLAN, the terminal may initiate a wireless link using a different RAT such as LTE.

As already mentioned, terminals in a WLAN have the possible states "connected", "active" and "disconnected". The above method is preferably performed when a terminal transitions from connected mode to active mode, not when a client is in the active mode.

According to a second aspect, there is provided a method of controlling a wireless local area network, WLAN, having access points arranged to maintain wireless links with terminals, and terminals each arranged to initiate a wireless link with a said access point and to associate with a said access point during a service session; the method comprising:
  gathering information from a plurality of the terminals via the wireless links between terminals and access points;
  determining, based on the gathered information, with which access point a terminal which has initiated a wireless link should associate during its service session; and
  notifying the terminal, via the access point with which the terminal initiated the wireless link, of the access point so determined.

According to a third aspect, there is provided a computer connected to access points of a WLAN and programmed to provide a central association server by performing the method defined above. Such a central association server may be used to control an enterprise-wide WLAN.

According to a fourth aspect of the present invention, there is provided computer-readable code which, when executed by a processor of a computer connected to access points of a WLAN, causes the computer to perform the method defined above.

The code may be stored on one or more non-transitive computer-readable recording media.

According to a fifth aspect, there is provided an access point for a WLAN, configured to accept, from a central association server, a notification identifying another access point with which a given terminal is to associate, and to forward said notification to that terminal.

According to a sixth aspect, there is provided a terminal for wireless communication with access points in a WLAN, configured to accept, from one access point, a notification identifying another access point with which a given terminal is to associate.

Thus, embodiments can provide a traffic congestion estimation method used for Wi-Fi based wireless networks. Based on measuring how busy the wireless channel of certain AP is and the single user transmission rate resulted from a specific radio link, an association criterion and a centralized algorithm are provided that can be used by a central association server to help active clients pick up suitable APs to be associated with. The centralized association algorithm aims at maximizing each client's potentially achievable data rate. With the intelligent management of clients' association pattern, the clients' QoE is improved and the network's congestion problems are relieved.

BRIEF DESCRIPTION OF THE DRAWINGS

Reference is made, by way of example only, to the accompanying drawings in which.

DETAILED DESCRIPTION OF THE PREFERRED EMBODIMENTS

An embodiment will now be described by way of example, referring to Wi-Fi, although it is to be understood that the embodiment is also applicable to other types of WLAN operating on the same principles.

Figure 4:
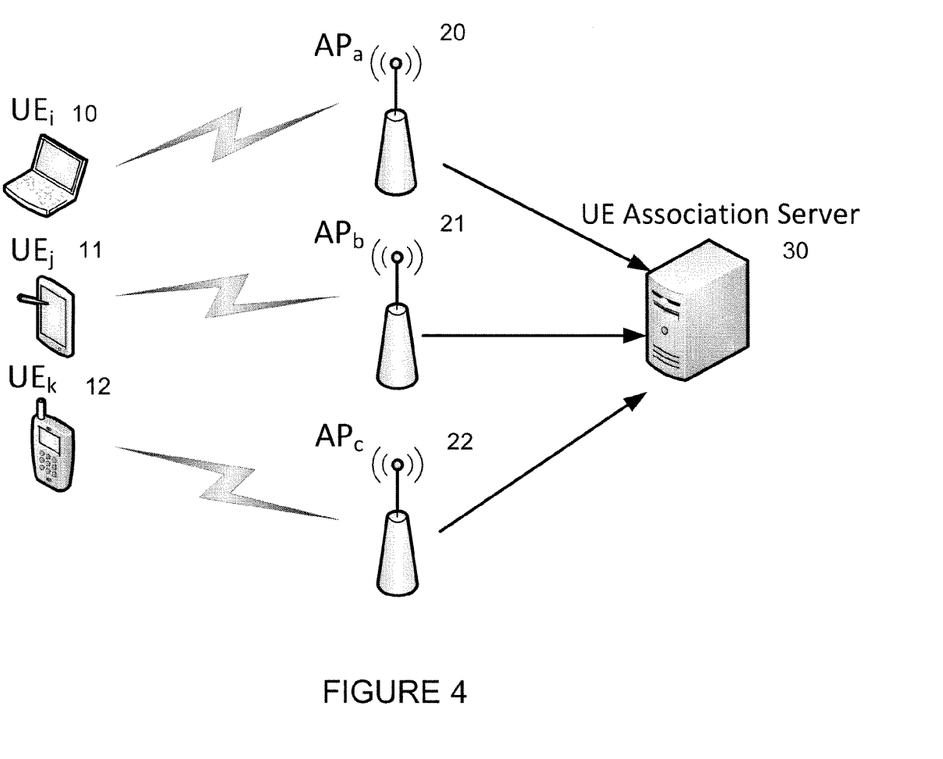
FIG. 4 shows the system architecture in an embodiment.

Methods of the embodiment are based on centralized system architecture, which in a simplified form is shown in FIG. 4. A plurality of APs 20, 21 and 22 are deployed in a WLAN to form overlapping hotspots within an enterprise, for example. A central association server 30 is connected to the APs by broadband cable for example (in practice, at least one network switch would be interposed between the central association server and APs). The central association server controls the WLAN at an enterprise level, for example. Thus, different WLANs would normally each have their own central association server. The central association server may have various functions apart from performing the method; for example it may perform other load balancing operations outside the scope of the embodiment.

The central association server 30 gathers information from clients (clients) 10, 11, and 12 through the radio link between each AP 20, 21 and 22 and client, and determines which AP each client should associate with once a client starts an active service session. As indicated in the FIG. the client devices may be of various types including a laptop PC 10, tablet computer 11, or mobile handset 12.

There are three statuses defined for each client, namely disconnected, connected and active as already mentioned with respect to FIG. 2. The information collected from clients include client location (optional), signal strength, measured congestion indicator (as explained below) and session information if a client starts a session. Session information refers to the general notification/indication to the server that a particular client wants to start a session, that is, a session request to an AP.

The method does not modify the initial association policies for the clients to become connected, but it optimizes the association pattern of an active client at the beginning of its service session, that is, after a client sends out a session request, the client's current association pattern is reviewed by the client association server and based on the proposed algorithm the client is redirected to the most suitable AP for enabling its current service session. The optimization principle used by the proposed algorithm is to improve individual clients' QoE (Quality of Experience) as represented by data rate, by maximizing each client's potentially achievable data rate. As a result, the system throughput of the enterprise WLAN can be significantly improved. System throughput can be defined as the sum total of throughput that all active clients in the network can potentially achieve.

Figure 5:
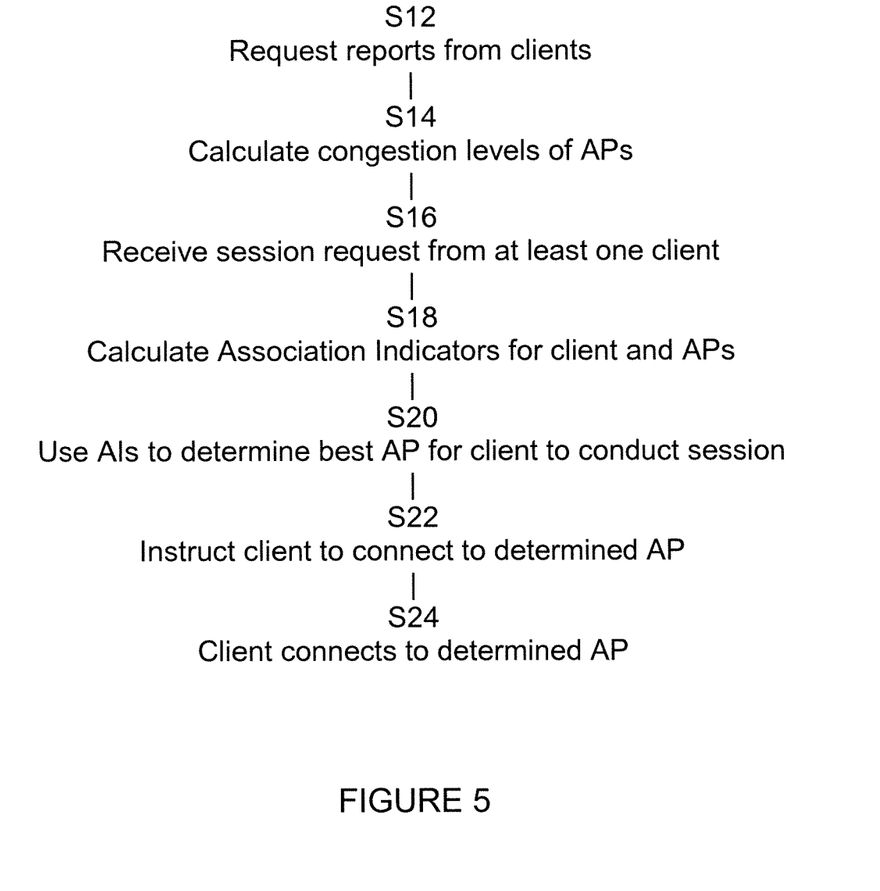
FIG. 5 shows steps of a method.

The high level optimization steps from the viewpoint of the central association server are shown in FIG. 5, and summarized as follows.

S12: It is assumed that some clients are already active in the WLAN. The central association server collects information from the connected clients in order to obtain knowledge about the current network situation, more particularly the loading on individual APs.

S14: The central association server calculates, based on the obtained information, congestion levels of APs.

Steps S12 and S14 may be considered as preliminary or preparatory steps to the method performed in relation to one specific client, which is triggered as follows.

S16: When a client enters the WLAN, it associates with (for example) the AP from which it receives the strongest signal strength, after which it becomes connected. When a connected client sends out a session request to its associated AP, the request is detected by the client association server by implementing a specific routing policy, which can be achieved using techniques such as OpenFlow™ as already mentioned, i.e. a tool that allows the path of packets through the network of switches to be determined by software running on multiple routers.

S18: Detection of the request from the client causes the central association server to calculate so-called Association Indicators (AIs) for the client with respect to each AP, as described below.

S20: The client association server determines the most suitable AP for the client to associate with based on its knowledge about the current network situation. This is called the "association pattern" for the client.

S22: The client association server, having decided on the most appropriate association pattern for the client, instructs the association pattern to the client through its initially associated AP.

S24: After receiving the instruction of association pattern, the client selects the instructed AP to associate with for enabling its service session. The client then conducts a session with the chosen AP in the usual way until the session terminates for whatever reason, for example by the client going out of range, or due to some load balancing operation outside the embodiment. In this case the client may re-associate with an AP, the algorithm then returning to step S16.

It should be noted that in the proposed association algorithm:

(i) no existing clients are handed over to another AP as a result of a new client association, and it is assumed that any load balancing issues will be dealt with at a separate stage. This means that when a decision that band x of AP y is assigned to client n for association is made in S20, it assumes no existing active clients in band x of AP y will be moved out in order to accommodate the newly associated client n. If, as a result of the new client n joining band x of AP y, this AP becomes congested and active clients may suffer from bad QoS, some other load balancing operation would be required to solve this AP congestion problem.

(ii) the association algorithm runs when a client transitions from connected mode to active mode, not when a client is in the active mode. If there are no clients doing this mode transitions in the network during some time periods, then the active clients' QoS degradation problems should be solved through another load balancing operation.

In the discussion which follows, it is further assumed that APs that are close to each other operate on orthogonal channels. Therefore there is no co-channel interference considered in the system model.

There will now be described a time-based congestion estimation algorithm, used by the central association server to calculate the congestion levels of APs.

(a) The Congestion Estimation Method

With the Wi-Fi's medium access method in mind, the more clients there are that are using the same AP, the fewer opportunities exist for each of them to use the wireless channel per unit time. For example, if the channel is idle and a client wants to send a data packet, the total amount of transmission time depends on the packet size, data rate, control and management signaling. Since there are no other active clients the data packet should be transmitted without any other delays. If the channel is busy, the transmission is further delayed by other client's traffic or by collision of using/seizing the channel at the same time as the number of clients using the same AP increases.

Based on this principle, a round trip time (RTT)-based congestion estimation algorithm is employed to measure how busy the wireless channel of an AP is. Detecting the RTT of sending and receiving some probe packets to a target AP can provide an indication of congestion on the target AP's wireless channel. The rationale is that since the RTT represents the latency of transmitting and receiving the probe packet, which is caused by the contention in using the target AP's channel by all its active clients' UL and DL traffic and the necessary signaling involved in transmitting the probe packet (control and management signaling time, data transmission time), it can indicate how busy the target AP's channel is.

An embodiment uses the existing network probe utility PING for this probing purpose. PING operates by sending an Internet Control Message Protocol (ICMP) echo request to the target host and waiting for an ICMP echo reply. A time stamp is added when an echo request is created. The host responds to an echo request with an echo reply containing the exact data received in the request message. PING uses the timestamp in the data area of echo reply to calculate a RTT. The RTT recorded by PING represents the time elapsed from when the packet is created to when the echo reply is received.

The congestion estimation algorithm is summarized as follows:

---

For APs that have at least one active client:

The client association server instructs an active client u in a target AP a to send periodical report on the measured RTT at a time interval $\delta_1$;
client u sends a number of PING probe packets to the target AP a at a time interval $\delta_2$;
client u records the RTT of each PING probe packet and normalizes it by a factor $T_f$, where $T_f$ is the maximum detectable RTT of AP a, the normalized RTT of probe packet i is denoted as $t_N(i)$;
At each sample n of sending the RTT measurement report,
client u averages the normalized RTT
values over the last $N_A$ probing samples falling into
the average window $T_A$ and sends out the averaged RTT value $t_A(n)$;
The client association server receives $t_A(n)$ at a time interval $\delta_1$ and uses $t_A(n)$ as the traffic congestion indicator over the last $\delta_1$ period;
When the active client u transitions to the mode of connected or disconnected at certain point, if there are other active clients remaining in AP a, then the client association server selects another active client v to carry on step 1 to 5; if there are no other active
clients left in AP a, then the procedure in the following category applies.
For APs that have no active clients:

The client association server regards the values of their traffic congestion indicators as zero.

---

It should be noted in the above procedure that, in order to minimize the time that the PING packet is in the mobile terminal's transmit buffer, preferably the active client that is selected to carry out the PING tests is the one that has the least uplink traffic. Also, when an active client is instructed to do PING tests, the information on the associated AP's IP address needs to be informed by the server to the client. As an alternative to receiving a request, clients can send reports unsolicited and/or periodically.

(b) The Client Association Algorithm (i) Association Indicator

When a client transitions from connected mode to active mode, it is desirable to select an AP for a client where it can expect to experience a good data rate. Unfortunately, it is very difficult to directly predict what data rate a client can expect to get when associated with an AP. The value depends on a number of factors, such as channel condition between the AP and the client, capability of the client in terms of autorate algorithm, power control, antenna and contention configurations that are in use, capability of the AP in terms of bandwidth, power, antenna, RAT (in particular 802.11 variant such as b, g, n . . . ) and contention configuration that are used and congestion condition of the AP, etc. Instead of estimating the impact of each of these factors, an embodiment focuses on the two factors that affect the expected data rate the most, which are: the transmission rate that the client and the AP can use to communicate with each other based on a specific radio link, and the congestion condition of the AP's wireless channel.

The impact of the transmission rate and the congestion condition are combined to form the association indicator for a client with respect to certain AP, which can indicate the estimated expected data rate (predicted data rate) for a client to associate with certain AP. The insight behind the metric is that the AP with the highest value of association indicator will allow the client to send the most data per unit time and in the meanwhile reduce the impact on other clients using the same AP. The association indicator between client i and channel x of AP a is defined as:

$$AI_i^{ax} = RI_i^{ax} \times (1 - CI_j^{ax}) \quad (1)$$

where $RI_i^{ax}$ stands for the transmission rate indicator between client i and channel x of AP a, the term "channel" referring to, for example, one channel on each of the 2.4 GHz and 5 GHz bands. Hence there is one AI for one operating frequency band of an AP which is associated with a particular channel.

Here, prior knowledge is assumed of an estimated transmission rate based on a certain radio link (e.g. a SNR to transmission rate mapping table is derived in advance); and $CI_j^{ax}$ is the congestion indicator of channel x of AP a, which is detected by client j (j≠i) that is using ax based on the proposed congestion estimation method. Thus, $CI_j^{ax}$ corresponds to $t_A(n)$ referred to earlier.

It should be noted that the calculation based on equation (1) is used to indicate the estimated expected data rate for a pair of client and AP, and the calculation does not have to be quantitatively accurate in terms of the predicted data rate. The purpose of calculating the association indicator is to help order the available APs of a client in a reasonable way and select a good AP for the client to associate with.

(ii) Association Algorithm

Based on the definition of association indicator, the association algorithm considering the preference of the client side and that of the AP side is presented as follows, assuming that one AP has one operating band (e.g. 2.4 or 5 GHz).

The Client Association Algorithm is Summarized as Follows.

---

If there is only one client i that requests to become active at a time in the network,
  then find its candidate APs based on its list of neighbor APs, calculate AIs for each of them, rank the candidate APs in the descending order of AI and assign client i to the AP with the highest rank;
  else if there are more than one clients that request to become active at a time in the network,
    Initialization:
    Case 1: the first round of running the association algorithm
    Record the clients that request to become active in the set $S_u$;
    Go to Association;
    Case 2: not the first round
    Update the set $S_u$ with $S_u'$;
    If $S_u = \emptyset$, then end running the current round;
    If $S_u \neq \emptyset$, then go to Association;
    Association:
      Order APs according to clients' preference:
    Order APs:
    For each client i in $S_u$
    Find its candidate APs based on its list of neighbor APs, calculate AIs for each of them based on the up-to-date CI information of each AP, and record the set of candidate APs for a client in the descending order of AI as $S_{AP}(u_i)$;
      Record all the candidate APs for all the clients in $S_u$ in the set $S_{AP}^{All}$;
      While $S_u \neq \emptyset$
      For each AP a in $S_{AP}^{All}$
      If AP a is considered by one client i as its best candidate AP, and AP a does not appear in other clients' candidate AP sets $S_{AP}(u_j)$ ($j \neq i$),
        then client i is assigned to AP a for association, remove client i from $S_u$, and remove the candidate AP set $S_{AP}(u_i)$ for client i;
      else if AP a is considered by more than one client as the current best candidate AP,
        then Rank these clients in the descending order of RSSI or long-term SNR:
        For the client with the highest rank, e.g. client i:
        if its current best candidate AP = its original best candidate AP and the current best candidate AP does not appear in other clients' candidate AP sets,
        then
          client i is assigned to AP a for association, remove client i from $S_u$, and remove the candidate AP set $S_{AP}(u_i)$ for client i;
          For the other clients with lower ranks: remove AP a from these clients' candidate AP sets $S_{AP}(u_j)$ ($j \neq i$);
        else if its current best candidate AP $\neq$ its original best candidate AP or its current best candidate AP appears in other clients' candidate AP sets,
          then client i is not assigned to AP a for association in the current round, remove client i and all the other clients that consider AP a as the current best candidate AP from $S_u$, record them in another set $S_u'$, and remove the candidate AP sets for the clients in $S_u'$;
        else if AP a is considered by one client i as its best candidate AP, but it appears in other clients' candidate AP sets $S_{AP}(u_j)$ ($j \neq i$) as their suboptimal candidate APs (second best, third best etc),
          then client i cannot be assigned to AP a for association until AP a does not appear in other clients' candidate AP sets as their suboptimal candidate APs.

---

Long-term SNR is calculated based on the path loss and shadow fading of the wireless channel. Incidentally, for an AP operating on multiple frequency bands, one AI is determined for each band, and the ranking will involve all the operating frequency bands of each client's candidate APs.

Thus, If terminals have the same best candidate, then the determination is made on the basis of association indicator between each terminal and the access point. Since the congestion indicator of an AP is the same for all the clients, fundamentally the comparison is of the channel conditions between each terminal and the AP.

It will be noted that a given terminal will only provide one congestion indicator for a certain AP; on the other hand, not every terminal needs to provide a congestion indicator for a certain AP. Only one of the active clients that are using an AP needs to send PING probe packets. Preferably the active client that is selected has least ongoing uplink traffic. If there are only connected but not active clients in an AP, then this AP is considered to have zero traffic load.

Figure 6:
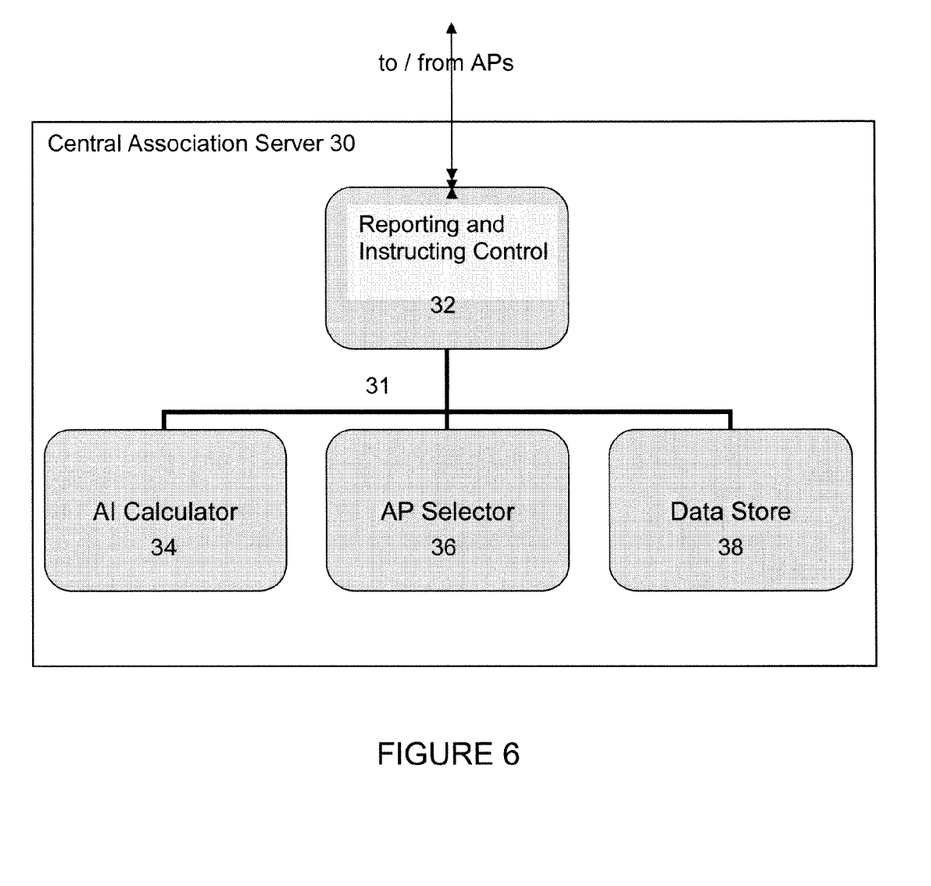
FIG. 6 shows functional blocks of an Association Server.

FIG. 6 outlines functional blocks in a central association server 30, for implementing the above-described method. The central association server has a Reporting Control and Instructing Block 32 connected to the backhaul network for receiving messages from, and transmitting messages to, clients via the APs. This is linked to the other functional blocks via an internal bus 31. An AI calculator 34 is provided for calculating the Association Indicators in the manner described above. Based on the results of the AI Calculator, an AP Selector block 36 determines which AP is the most suitable for a client to associate with, and sends its determination to the Reporting and Instructing Control Block 32 for transmission to the client concerned. Meanwhile a Data Store 38 stores the information gathered about the network, and is referred to by the AI Calculator 34 and AP Selector 36. The central association server may of course be provided by a suitably-programmed server (for example the server in a software-defined network as mentioned earlier) and therefore the functional units shown need not correspond to discrete hardware units.

To summarize, an embodiment can provide a traffic congestion estimation method used for a WLAN comprising wireless terminals 10, 11, 12 and access points 20, 21, 22. Based on measuring how busy the wireless channel of certain access point is, and the single user transmission rate resulted from a specific radio link, an association indicator is derived and a centralized association server 30 notifies a terminal 10, 11, 12 initiating a wireless link of the most suitable access point 20, 21, 22 to be associated with. The centralized association server 30 aims at maximizing each client's potentially achievable data rate. With the intelligent management of clients' association pattern, the clients' QoE is improved and network's congestion problems are relieved.

Various modifications are possible within the scope of the embodiment.

Although the described embodiment has been explained with respect to Wi-Fi, this is only an example of a WLAN standard suitable for applying the embodiment.

Although not directly applicable to other RATs such as LTE or WiMAX, the embodiment nevertheless is useful in a multi-RAT environment, where it may be desired to offload as much data traffic as possible from a cellular network to the WLAN.

It is assumed above that a client device makes an initial wireless connection with an AP in a conventional manner, for example using Wi-Fi and selecting an AP on the basis of greatest signal strength. The client's initial wireless link could be either with Wi-Fi or other non-802.11 RATs if available. For example an AP may also be a femtocell eNB of an LTE-based wireless cellular system. However, the embodiment relates to determining the best AP with which the client is to conduct a Wi-Fi service session. Thus, a client can be switched from Wi-Fi to Wi-Fi, or from femto to Wi-Fi, but would not be switched from femto to femto or Wi-Fi to femto.

In general, where an optimal solution is sought a suboptimal choice may nevertheless be made if other needs demand it, without departing from the principles of this embodiment.

INDUSTRIAL APPLICABILITY

The dense deployment of small cell networks (SCN) has gained much attention in the mobile industry due to its potential for coping with fast growing data traffic. However with the typical configuration of clients, clients themselves select which AP to associate with using only locally available information and most of them use signal strength as the dominant factor in selecting an AP. This can result in some APs becoming more congested than others, causing the degradation in QoE of clients.

To address this problem, this embodiment presents a centralized optimization method for managing the client's association pattern with different APs which is applied when a client starts an active service session and targets at maximizing each client's potentially achievable data rate. Utilizing the embodiment will benefit both the network and mobile terminals in terms of easing network congestion and improving clients' QoE.

What is claimed is:

1. A wireless local area network, WLAN, comprising:
    access points arranged to maintain wireless links with terminals;
    terminals each arranged to initiate a wireless link with an access point and become connected, and thereafter to transition to an active mode in which the terminal associates with an access point during a service session; and
    a central association server connected to each of the access points, and arranged to:
    gather information from a plurality of the connected terminals via the wireless links between terminals and access points;
    determine, based on the gathered information, with which access point a terminal which has initiated a wireless link and become connected should associate during its service session; and notify the terminal, via the access point with which the terminal initiated the wireless link, of the access point so determined; wherein
    the terminals are arranged, after initiating a wireless link with an access point and becoming connected but before transitioning to the active mode, to send a session request to that access point, and the central association server is arranged to detect the session request and to perform the determining in response to detecting the session request; and
    the information gathered from a terminal by the central association server includes at least an indication of a channel condition between the terminal and each of a plurality of access points and an indication of congestion on a wireless link between the terminal and an access point which maintains the wireless link with the terminal; wherein
    the central association server is arranged to derive a transmission rate from the indication of channel condition received from a terminal with respect to an access point, and to combine the transmission rate with indications of congestion with respect to the said access point received from other said terminals, to form an association indicator for the said terminal with respect to the said access point, the association indicator having a value representing an expected data rate of a wireless link between the said terminal and the said access point.

2. The WLAN according to claim 1 wherein the terminals are arranged to provide information to the central association server in response to a request from the central association server, received via the wireless links between terminals and access points.

3. The WLAN according to claim 1 wherein each terminal is arranged to measure round-trip times of packets on said wireless link to and from the access point, and to provide an average of said times to the central association server as said indication of congestion.

4. The WLAN according to claim 1 wherein, for each terminal which sends a session request to an access point, the central association server is further arranged to:
    form the association indicator for the terminal with respect to each of a plurality of access points,
    arrange the access points by value of the respective association indicators, to provide a list of candidate access points for the terminal in order of preference, and
    determine the access point with which the terminal should associate during its service session by comparing the candidate access points for the terminal with the candidate access paints of other terminals.

5. The WLAN according to claim 4 wherein in the event that more than one terminal has the same preference for a given access point, the determining is made on the basis of the association indicator for each terminal with respect to the access paint.

6. The WLAN according to claim 1, wherein a terminal initiates a wireless link with an access paint using a cellular network radio access technology which is different from the WLAN radio access technology employed by the access paint determined in said determining to maintain the service session.

7. A method of controlling a wireless local area network, WLAN, having access points arranged to maintain wireless links with terminals, and terminals each arranged to initiate a wireless link with an access paint and become connected, and thereafter to transition to an active mode in which the terminal associates with an access point during a service session; the method comprising:
- gathering information from a plurality of connected terminals via the wireless links between terminals and access points;
- determining, based on the gathered information, with which access point a terminal which has initiated a wireless link and become connected should associate during its service session; and
- notifying the terminal, via the access point with which the terminal initiated the wireless link, of the access point so determined; wherein
- the terminals, after initiating a wireless link with an access point and becoming connected but before transitioning to the active mode, send a session request to the access point, the method further comprising detecting the session request and performing the determining in response to detecting the session request; and
- the information gathered from terminals in said gathering includes at least an indication of a channel condition between the terminal and each of a plurality of access points and an indication of congestion on a wireless link between the terminal and an access point which maintains the wireless link with the terminal; wherein
- the central association server is arranged to derive a transmission rate from the indication of channel condition received from a terminal with respect to an access point, and to combine the transmission rate with indications of congestion with respect to the said access point received from other said terminals, to form an association indicator for the said terminal with respect to the said access point, the association indicator having a value representing an expected data rate of a wireless link between the said terminal and the said access point.

8. A computer connected to access points of a WLAN and programmed to provide a central association server by performing the method of claim 7.

9. A non-transitory computer-readable recording media on which is stored computer-readable code which, when executed by a processor of a computer connected to access points of a WLAN, causes the computer to perform the method of claim 7.

* * * * *